(12) United States Patent
Tsuchiya et al.

(10) Patent No.: US 6,527,845 B1
(45) Date of Patent: Mar. 4, 2003

(54) OIL-BASED INK FOR INK-JET RECORDING

(75) Inventors: Tatsurou Tsuchiya, Osaka (JP); Masanori Kano, Osaka (JP)

(73) Assignee: Sakata Inx Corp., Osaka (JP)

( * ) Notice: Subject to any disclaimer, the term of this patent is extended or adjusted under 35 U.S.C. 154(b) by 0 days.

(21) Appl. No.: 09/744,026

(22) PCT Filed: Dec. 24, 1999

(86) PCT No.: PCT/JP99/07243
§ 371 (c)(1),
(2), (4) Date: Jan. 19, 2001

(87) PCT Pub. No.: WO00/71627
PCT Pub. Date: Nov. 30, 2000

(30) Foreign Application Priority Data

May 20, 1999 (JP) ............................................ 11-140258
Jun. 24, 1999 (JP) ............................................ 11-178687

(51) Int. Cl.⁷ ................................................. C09D 11/02
(52) U.S. Cl. .................................. 106/31.88; 106/31.62
(58) Field of Search ............................ 106/31.88, 31.62

(56) References Cited

U.S. PATENT DOCUMENTS

| 4,385,149 | A | * | 5/1983 | Tsuchiya et al. ............ 524/313 |
| 5,190,582 | A |   | 3/1993 | Shinozuka et al. |
| 5,282,896 | A | * | 2/1994 | Tsuchida et al. ............ 106/411 |
| 5,453,121 | A |   | 9/1995 | Nicholls et al. |
| 5,803,962 | A | * | 9/1998 | Kobayashi et al. ......... 106/31.8 |
| 6,019,829 | A | * | 2/2000 | Omae et al. ............. 106/31.65 |
| 6,395,805 | B1 | * | 5/2002 | Takao ......................... 523/205 |
| 6,444,019 | B1 | * | 9/2002 | Zou et al. .................. 106/31.4 |

FOREIGN PATENT DOCUMENTS

| JP | 4-25573   | 1/1992 |
| JP | 7-11181   | 1/1995 |
| JP | 11-293169 | 10/1999 |

* cited by examiner

*Primary Examiner*—Mark L. Bell
*Assistant Examiner*—Veronica F. Faison
(74) *Attorney, Agent, or Firm*—Armstrong, Westerman & Hattori, LLP

(57) ABSTRACT

An oil-based ink for ink-jet recording comprising mainly an organic solvent, a pigment and a dispersing agent, said organic solvent comprising a saturated hydrocarbon solvent and a vegetable oil in a weight ratio of 100:(10 to 100), in order to provide an oil-based ink for ink-jet recording which possesses good spouting stability and storage stability without being influenced by temperature changes in printing circumstances, and causes little cockling.

11 Claims, No Drawings

OIL-BASED INK FOR INK-JET RECORDING

TECHNICAL FIELD

The present invention relates to an oil-based ink for ink-jet recording. More particularly, the invention relates to an oil-based ink for ink-jet recording which is excellent in ink spouting stability and storage stability without being influenced by temperature changes in printing circumstances, and causes little cockling.

BACKGROUND ART

In the field of an ink-jet recording system, both sides of apparatus and ink have been studied so that an image having clear colors can be stably printed at a high speed without decrease in density and without bleeding.

Currently, as printers, a system using a piezo-vibrating element, a system using a thermal head, a system utilizing an electric attraction, and the like are known.

Among them, the system using a piezo-vibrating element is excellent in availabilities from the viewpoint that the constitution of a recording head device therein is simple, and restrictions on electric and thermal performance to ink are less as compared with the other systems. Besides, as ink which is applied to a printer of this type, an oil-based type of ink in which a pigment is dispersed in a saturated hydrocarbon solvent has been recently put to practical use.

However, a pigment type of ink intrinsically has the so-called problem of low reliability as an ink-jet recording liquid, such as poor storage stability or spouting performance of the ink itself.

On the other hand, in order to increase the surface tension of ink so as to reduce clogging of a nozzle, it is more effective to contain a cycloparaffin (i.e., naphthene) in ink as a saturated hydrocarbon; however, when a printed matter as provided from ink containing a cycloparaffin is stored within a commercially available transparent document holder or the like, such a problem that the holder is swelled up to cause a cockling occurs.

Furthermore, such an attempt that an isoparaffin having a low melting point and a high boiling point is contained in ink in a large amount so as to maintain a liquid state thereof to a lower temperature and to prevent clogging of a nozzle which is caused by drying due to evaporation, has also been carried out. However, the surface tension of the resultant ink is lowered, and thus there exists a problem that a nozzle is easily clogged to cause a spouting failure.

Thus, an ink-jet recording ink in which a saturated hydrocarbon type organic solvent is used as a dispersing medium has various problems.

Accordingly, for example, as an improvement on the spouting performance of ink, a method in which an aliphatic hydrocarbon type organic solvent is used in combination with a polar solvent such as oleyl alcohol is disclosed in JP,A, 10-507487 and the like. According to this method, it is designed that the wettability of ink to a nozzle is controlled by combination use of the polar component so as to make a backward movement of ink after discharge from the front end of the nozzle to the interior thereof to prevent drying thereof.

However, when a saturated hydrocarbon solvent is used in combination with a polar solvent as in the aforesaid method, there is a problem that the storage stability of ink is still more decreased so that a pigment is precipitated during storage.

In view of the foregoing, it is an object of the invention to provide an oil-based ink for ink-jet recording which is excellent in spouting stability and storage stability over a wide temperature range from a low temperature to ordinary temperature or more, and furthermore low in cockling property.

DISCLOSURE OF THE INVENTION

Thus, the present invention provides an oil-based ink for ink-jet recording as follows:

(1) An oil-based ink for ink-jet recording comprising mainly an organic solvent, a pigment and a dispersing agent, said organic solvent comprising a saturated hydrocarbon solvent and a vegetable oil in a weight ratio of 100:(10 to 100).

(2) The oil-based ink for ink-jet recording of the above (1), wherein said saturated hydrocarbon solvent comprises both components of an isoparaffin solvent and a cycloparaffin solvent.

(3) The oil-based ink for ink-jet recording of the above (1) or (2), wherein said saturated hydrocarbon solvent comprises a liquid paraffin as a main component, said liquid paraffin having a viscosity of 20 mPa·s or less at a temperature of 25° C.

(4) The oil-based ink for ink-jet recording of the above (3), wherein said liquid paraffin is a liquid paraffin which passes at least one test selected from the group consisting of a purity test for liquid paraffin prescribed in the Japanese Pharmacopoeia, a purity test for liquid paraffin prescribed in the Japanese Standards of Food Additives, and a purity test for liquid paraffin prescribed in the Standards for Cosmetic Ingredients established in Japan.

(5) The oil-based ink for ink-jet recording of any one of the above (1) to (4), wherein said vegetable oil comprises at least one selected from the group consisting of a semidrying oil and a nondrying oil.

(6) The oil-based ink for ink-jet recording of any one of the above (1) to (5), wherein said vegetable oil comprises at least one selected from the group consisting of soybean oil, rape seed oil and olive oil.

(7) The oil-based ink for ink-jet recording of any one of the above (1) to (6), wherein said dispersing agent comprises a reaction product of an amine compound and a self condensation product of 12-hydroxystearic acid.

(8) The oil-based ink for ink-jet recording of any one of the above (1) to (7), which has a surface tension of 26 to 30 dyne/cm at a temperature of 25° C., and a contact angle to an ethylene fluoride/propylene copolymer film of 40° to 50°.

(9). The oil-based ink for ink-jet recording of any one of the above (1) to (8), which has a volume resistivity of $10^8$ Ω·cm or more.

Hereinafter, the present invention will be more particularly explained.

First, as pigments used in the present invention, various inorganic or organic pigments which can be used in a common ink-jet recording ink can be used, and as particularly useful ones, C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I. Pigment Red 122, 202, and a solid solution of C.I. Pigment Red 122 and 202; C.I. Pigment Blue 15; C.I. Pigment Violet 19, 23 and 33; C.I. Pigment Black 7; and the like can be enumerated.

In an ink-jet recording system, the four colors of yellow, magenta, cyan and black are basically used, and recently the six colors in which orange and green are added thereto are used, and furthermore the eight colors in which light-magenta and light-blue are added thereto are used, so as to form a color image and the like.

In order to provide these hues, pigments which are excellent in weather resistance among the above-mentioned ones are suitable. Among others, as yellow, C.I. Pigment Yellow 138, 154, 180 and 185; as magenta, C.I. Pigment Red 122 and 202, and C.I. Pigment Violet 19; as cyan, C.I. Pigment Blue 15; as black, an acidic or neutral pigment of C.I. Pigment Black 7; as orange, C.I. Pigment Orange 43, 64 and 71; and as green, C.I. Pigment Green 7 and 36 are more suitable.

In the present invention, a suitable amount of a pigment is 0.5 to 30% by weight in an ink-jet recording oil-based ink, more suitably 1 to 10% by weight. When the amount of a pigment is too small, the color density of ink is lowered, while too large, printing becomes difficult due to ink viscosity or flowability.

Next, an organic solvent as used in the present invention mainly comprises a saturated hydrocarbon solvent and a vegetable oil.

As saturated hydrocarbon solvent utilized in the present invention, commercially available saturated hydrocarbon solvents which are used mainly in the existing ink-jet recording oil-based ink, for example, mixtures of isoparaffins such as Isopar E, Isopar G, Isopar H, Isopar L and Isopar M (each of the above made by Exxon Chemical Company), Shellsol (made by Shell Chemical Company), Soltrol (made by Philips Oil Co., Ltd.), Begasol (made by Mobil Petroleum Co., Inc.) and IP Solvent 2835 (made by IDEMITSU PETROCHEMICAL CO., LTD.); and mixtures of cycloparaffins such as Exxsol D130 (made by Exxon Chemical Company), can be enumerated. Some of these commercially available solvents contain a small amount of an unsaturated hydrocarbon; however, they can be used without hindrance in the present invention. Furthermore, liquid paraffins each of which is a mixture mainly comprising three components of a normal paraffin, an isoparaffin and a monocyclic cycloparaffin and which include those called as more volatile liquid paraffins in the Japanese Pharmacopoeia, for example, commercially available ones such as MORESCO WHITE P-40, MORESCO WHITE P-55 (made by MATSUMURA OIL RESEARCH CORP.), Liquid Paraffin No.40-S, Liquid Paraffin No.55-S (made by Chuo Kasei Co., Ltd.), can be enumerated.

Besides, normal-paraffin type hydrocarbons such as octane, nonane, decane and dodecane; isoparaffin type hydrocarbons such as isooctane, isodecane and isododecane; cycloparaffin type hydrocarbons such as cyclohexane, cyclooctane, cyclodecane and decalin; and the like can also be used.

Among these saturated hydrocarbon solvents, from the viewpoint of obtaining ink having excellent spouting stability over a wide temperature range, it is preferred to use a mixture of a cycloparaffin solvent having as a high surface tension as possible and an isoparaffin solvent having a low melting point and a high boiling point. When a cycloparaffin solvent and an isoparaffin solvent are used together, a ratio of 20 to 70% by weight of the cycloparaffin solvent, and 30 to 80% by weight of the isoparaffin solvent on the basis of the total weight of both solvents is preferred. Among others, liquid paraffins are most preferable, which contain both components in a well-balanced amount.

Accordingly, if a liquid paraffin is used as a main component, when a solvent having a lower melting point is necessary in a cold district and the like, an isoparaffin solvent can be used therewith in such a range that a proper surface tension can be maintained, while when a higher surface tension is necessary, a cycloparaffin solvent can be used therewith in such a range that a low melting point can be maintained.

In this connection, a liquid paraffin is a hydrocarbon oil which is obtained by highly refining a relatively volatile lubricating oil fraction through a sulfuric-acid washing or the like. As the liquid paraffin, a liquid paraffin which is refined to such a level that ultraviolet absorbing impurities are not substantially included therein, and according to the purpose of use, passes at least one test selected from the group consisting of a purity test for liquid paraffin prescribed in the Japanese Pharmacopoeia, a purity test for liquid paraffin prescribed in the Japanese Standards of Food Additives and a purity test for liquid paraffin prescribed in the Japanese Standards for Cosmetic Ingredients, is more preferable even from the viewpoint of workability and hygiene.

Incidentally, the above-mentioned three purity tests for liquid paraffin and the standard values are described in the fourteenth revised Japanese Pharmacopoeia, the seventh edition of the Official Standards of Food Additives, and the Standards for Cosmetic Ingredients as based on Notification No. 181 of the Ministry of Public Welfare, respectively, as the newest ones.

As a saturated hydrocarbon solvent used in the present invention, from the viewpoint of spouting stability of ink, one having a viscosity of 20 mPa·s or less at a temperature of 25° C. is preferred. Besides, a mixture of a saturated hydrocarbon solvent having a low viscosity and a saturated hydrocarbon solvent having a high viscosity which is adjusted to have the above-mentioned viscosity can also be used. Furthermore, when a balance between an increase in printing speed due to drying by evaporation and clogging of a nozzle is taken into consideration, it is preferable that the boiling point of the saturated hydrocarbon solvent is in the range of 180° to 360° C./760 mmHg. When a mixture of saturated hydrocarbon solvents is used, it is preferable that most of the components thereof are in the above-mentioned boiling point range.

As mentioned above, according to performance as required of ink, saturated hydrocarbon solvents suitable therefor can be mixed and used; however, only saturated hydrocarbon solvent (s) can not inherently provide a sufficient solubility of the after-mentioned pigment dispersing agent, and in particular, the lower a temperature becomes, the more remarkable the tendency becomes.

Therefore, according to the present invention, a vegetable oil is used therewith as an organic solvent so as to improve the solubility of a pigment dispersing agent, and at the same time, the surface tension of ink is enhanced, and thus the effects that the spouting stability of ink also becomes excellent, and furthermore cockling property is decreased are provided.

As vegetable oils which can be used in the present invention, semidrying oils such as soybean oil, cotton seed oil, sunflower oil, rape seed oil, mustard oil, sesame oil and corn oil; nondrying oils such as olive oil, peanut oil and tsubaki oil; and drying oils such as linseed oil and safflower oil can be enumerated, wherein these vegetable oils may be used individually or as a mixture thereof.

In particular, from the viewpoint of the properties, semi-drying oils and nondrying oils which are low in polymerization property due to oxidation are preferable; among others, rape seed oil and olive oil, which are low in viscosity; and soybean oil, which is inexpensive, are more preferable.

Regarding organic solvents which can be used in the present invention, amounts of a saturated hydrocarbon solvent and a vegetable oil are such that a weight ratio of a saturated hydrocarbon solvent to a vegetable oil is in the range of 100:(10 to 100), preferably 100:(12 to 60). When an amount of the vegetable oil is smaller than the above-mentioned range, a variation in an amount of ink spouted is increased due to temperature changes in printing circumstances, and the storage stability of ink in particular at a low temperature is degraded, and thus such amount is not preferred. On the other hand, when an amount of the vegetable oil is larger than the above-mentioned range, it becomes difficult to provide ink having a low viscosity, and a decrease in drying property of a printed matter or clogging due to oxidation polymerization tends to occur, thus such amount is not preferred. Further, from the viewpoint that the above-mentioned desired effects should be sufficiently provided, it is preferred that the total amount of a saturated hydrocarbon solvent and a vegetable oil in an organic solvent is 70% by weight or more, in particular, 80% by weight or more.

Furthermore, in order to adjust drying property or melting point, if necessary, in the organic solvent, a lower alcohol such as methanol, ethanol or propanol, or an alkyl ether of (poly)alkylene glycol such as (poly)ethylene glycol or (poly)propylene glycol, each of which is an organic solvent which is miscible with the saturated hydrocarbon solvent, may be contained in an organic solvent in such a range that the surface tension of ink and the like are not decreased.

Incidentally, ester solvent, ketone solvent and aromatic hydrocarbon solvent and the like can be used; however, these may damage a printer. Thus, it is preferred that they are not contained in a large amount.

An organic solvent including the above-mentioned materials is preferably adjusted to satisfy such a condition that it is maintained in a state of liquid at a temperature of an environment on use, and furthermore a melting point becomes to be −20° C. or less from the viewpoint of an environment of transportation or storage.

Next, as dispersing agents which are used to disperse a pigment in an organic solvent, various pigment dispersing agents and pigment dispersing resins having a high molecular weight which can be dissolved in the organic solvent can be used.

As more preferable pigment dispersing agents, for example, a reaction product of an amine compound and a self condensation product of 12-hydroxystearic acid can be used; specifically, a reaction product of a polyallylamine and a self condensation product of 12-hydroxystearic acid; a reaction product of a polyethylenepolyamine and a self condensation product of 12-hydroxystearic acid, such as Solsperse 13940 (made by Zeneka Co., Ltd.) as a commercial product, and the like; a reaction product of a dialkylaminoalkylamine and a self condensation product of 12-hydroxystearic acid, such as Solsperse 17000, 18000 (made by Zeneka Co., Ltd.) as commercial products, and the like are enumeratd.

Besides, long-chain alkylamine acetate compounds such as octadodecylamine acetate; quaternary ammonium salts such as hydrogenated tallow trimethylammoniumchloride; polyoxyethylene derivatives such as polyoxyethylene monostearate; sorbitan long-chain fatty acid ester compounds such as sorbitan monooleate, sorbitan monolaurate and sorbitan monostearate; and as a commercial product, Sorsperse 5000 (made by Zeneka Co., Ltd.), which is a pigment derivative, and EFKA 47 (made by EFKA CHEMICALS B.V.), which is a polyamine compound, and the like can be enumerated.

On the other hand, as pigment dispersing resins, petroleum resins, rosin-modified maleic resins, rosin-modified phenol resins, alkylphenol resins, alkyd resins, aminoalkyd resins, acrylic resins, polyamide resins and cumarone-indene resins, and the like can be enumerated. Among others, petroleum resins or rosin-modified maleic resins are more preferable, each of which is excellently soluble in an organic solvent as used in the present invention.

As the amount of these dispersing agents, about 0.1 to 10 times of the amount of a pigment used on a weight basis are suitable.

Furthermore, in order to improve fixing property of ink to a matter to be printed, and the like, various binder resins as used in common ink-jet recording oil-based inks can be used, and besides, various additive agents such as a surface active agent, a viscosity modifier, an anti-foaming agent and a film-forming assistant can be added thereto.

As a method of producing an ink-jet recording oil-based ink by using these materials, a method comprising the steps of: dissolving a dispersing agent into a saturated hydrocarbon solvent alone or into a mixed solvent of a saturated hydrocarbon solvent and a vegetable oil to prepare a dispersing agent solution; and adding with agitating a pigment, if necessary, a vegetable oil, another organic solvent, a surface active agent or the like thereto; grinding the same by means of a grinder; and thereafter, if necessary, adding and mixing a let-down composition thereto can be used.

As the above-mentioned grinder, for example, a wet circulation mill, a beads mill, a ball mill, a sand mill, Attritor, a roll mill, an agitator, Henschel mixer, a colloid mill, an ultrasonic homogenizer, an ultra-high pressure homogenizer, a perl mill, and the like can be enumerated; in particular, in the case of an ink-jet recording liquid, it is necessary to more finely disperse a pigment as compared with a common printing ink, and thus, among the above-mentioned types, the wet circulation mill is preferred.

An ink-jet recording oil-based ink according to the present invention preferably has a viscosity in the range of 1.0 to 30.0 mPa·s, more preferably in the range of 10.0 to 20.0 mPa·s, at an environment temperature on use. An ink-jet recording ink having a viscosity in this range provides a good spouting stability on a high speed printing.

Furthermore, it is in particular preferable that the ink of the present invention has a surface tension in the range of 26 to 30 dyne/cm at a temperature of 25° C. and a contact angle on the surface of an ethylene fluoride/propylene copolymer film (i.e., a FEP film) in the range of 40° to 50°. When ink is in this range, the interior of a nozzle can be speedily filled with ink, and the clogging of the nozzle can be reduced.

The above-mentioned values of the contact angle on the FEP film are obtained as follows: A film of TOYOFLON 50F (with a thickness of 50 $\mu$m) made by TORAY PLASTICS FILMS CO., LTD. is used. An ambient temperature of 25° C., a drop of ink is dropped with a syringe on the horizontal plane thereof, and then, as soon as the ink comes in contact with the film, a contact angle is determined.

An ink-jet recording oil-based ink according to the present invention is suitable for an on-demand ink-jet recording system, in which a piezo-vibrating element is used so as to spout ink, and an excellent spouting property can be provided for printers using an ink-jet recording oil-based ink, which are currently placed on the market.

Additionally, an ink-jet recording oil-based ink according to the present invention preferably has a volume resistivity of $10^8$ Ω·cm or more; however, a charging agent is not contained therein. Therefore, the spouting property as required for this ink-jet recording oil-based ink is inherently different from that as required for ink which is used in such an ink-jet recording system in which electrical attraction which is generated between charged ink droplets and an electrode is utilized to continuously fly the droplets.

An ink-jet recording oil-based ink according to the present invention has stable spouting property over a wide temperature range on printing, and is excellent in storage stability at a low temperature, and furthermore it is an ink-jet recording ink which is low in cockling property.

For an organic solvent for an ink-jet recording ink using a pigment as a coloring agent as in the present invention, it is necessary that the solvent is excellent in pigment dispersing property, has a high surface tension, and has a low melting point and a high boiling point so that the storage stability and spouting stability of ink are excellent over a wide temperature range from a low temperature to ordinary temperature or more, and furthermore, the solvent causes no cockling to a polyolefin film which is used as a material for a transparent document holder. Thus, a lot of performance are required therefor.

In the present invention, among saturated hydrocarbon solvents which are used as an organic solvent, first, isoparaffin is preferred from the viewpoint that it has a low melting point and can be maintained in a state of liquid to a lower temperature, and is low in cockling property; and then cycloparaffin is preferred from the viewpoint that it has a high surface tension, and clogging of a nozzle is decreased.

Thus, when a liquid paraffin in which these saturated hydrocarbon compounds are contained in a well-balanced proportion is compared with another saturated hydrocarbon mixture (such as Isopar) which is a solvent for an ink-jet recording oil-based ink as currently put to practical use, the former liquid paraffin is excellent in spouting stability over a wide temperature range from a low temperature to ordinary temperature or more, and furthermore, no injurious ingredients are included therein, and thus, the former liquid paraffin provides the effect that a printing work environment is not deteriorated.

However, only saturated hydrocarbon solvent (s) is low in dissolving power to a dispersing agent in particular at a low temperature, and furthermore it can not maintain a high surface tension, and thus it provides ink of such a level that storage stability and spouting stability are not sufficient.

On the other hand, a vegetable oil has many advantages as follows: it is highly compatible with a saturated hydrocarbon compound, and has a relatively high surface tension and wettability to the surface of a pigment, and furthermore, it is high in dissolving power to a dispersing agent in particular even at a low temperature, and it does not swell polyolefin.

Therefore, for an organic solvent for an ink-jet recording oil-based ink, a saturated hydrocarbon compound and a vegetable oil are used together in a specified proportion, and thereby, an ink-jet recording ink which has a stable spouting property over a wide temperature range on printing, and is excellent even in storage stability at a low temperature, and furthermore, is low in cockling property, can be provided.

BEST MODE FOR CARRYING OUT THE INVENTION

Hereinafter, the present invention will more specifically explained by means of Examples; however, the present invention is not intended to be limited to the Examples. Incidentally, as long as a particular notice is not given, in the Examples, the unit "part(s)" and "%" represent—part(s) by weight—and—% by weight—, respectively.

Preparation of Base Ink

Three parts of a reaction product of polyallylamine and a self condensation product of 12-hydroxystearic acid as a dispersing agent were dissolved into 12 parts of Liquid Paraffin No.40-S (made by Chuo Kasei Co., Ltd.), and 5 parts of Carbon Black MA-7 (made by Mitsubishi Chemical Corporation) as a pigment was added thereto with agitating, and thereafter, the resultant mixture was ground by using a beads mill to provide base ink No. 1.

Three parts of Solsperse 17000 and 0.5 part of Solsperse 5000 as a dispersing agent were dissolved into 11.5 parts of Liquid Paraffin No.40-S (made by Chuo Kasei Co., Ltd.), and 5 parts of Carbon Black MA-7 (made by Mitsubishi Chemical Corporation) as a pigment was added thereto with agitating and thereafter, the resultant mixture was ground by using a beads mill to provide base ink No.2.

Three parts of Solsperse 17000 and 0.5 part of Solsperse 5000 as a dispersing agent were dissolved into 11.5 parts of Isopar M which is a mixture of isoparaffins (made by Exxon Chemical Company), and 5 parts of Carbon Black MA-7 (made by Mitsubishi Chemical Corporation) as a pigment was added thereto with agitating and thereafter, the resultant mixture was ground by using a beads mill to provide base ink No.3.

EXAMPLES 1 TO 10 AND COMPARATIVE EXAMPLES 1 TO 5

According to formulations shown in Table 1, various materials were mixed with agitating to provide ink-jet recording oil-based inks of Examples 1 to 10 and Comparative Examples 1 to 5, each of which had a viscosity of about 10 mP·s at a temperature of 25° C. and a volume resistivity in the range of $10^9$ to $10^{10}$ Ω·cm.

Incidentally, No.55-S is a liquid paraffin (made by Chuo Kasei Co., Ltd.); IP Solvent 2835 is a mixture of isoparaffins (IDEMITSU PETROCHEMICAL CO., LTD.); and Exxsol D130 is a mixture of cycloparaffin and paraffin (Exxon Chemical Company).

Performance Evaluation a. Determination of Surface Tension

A surface tension of an ink-jet recording oil-based ink in each of Examples 1 to 10 and Comparative Examples 1 to 5 was determined at a temperature of 25° C. by using a surface tension meter (a dynamic wetting tester, made by RHESCA CORP.). The results are shown in Table 1.

b. Determination of Contact Angle

At an ambient temperature of 25° C., a drop of ink was dropped with a syringe on the horizontal plane of TOYO-FLON 50F (with a thickness of 50 μm) made by TORAY PLASTIC FILM CO., LTD. Then, a contact angle was determined immediately after the ink came in contact with the film.

c. Low Temperature Storage Stability

An ink-jet recording oil-based ink in each of Examples 1 to 10 and Comparative Examples 1 to 5 was introduced into a glass bottle, which was then stoppered tightly. The ink was left at a temperature of 0° C. for a period of one month, and thereafter further left at a temperature of –10° C. for a period of one month. Low temperature storage stability was evaluated on the basis of presence or absence of a precipitate and state of the precipitate, wherein:

A: No precipitate;

B: Some precipitate is formed, which is dissolved after a light shaking; and

C: Precipitate is not dissolved even after a severe shaking.

d. Spouting Stability at Ordinary Temperature

At a temperature of 25° C. which is considered to be a temperature in a usual room, a printer (IP-4000, a piezo-type, made by Seiko Instruments Co., Ltd.) adapted to a commercial ink-jet recording oil-based ink was used to conduct continuous solid-printing on a specialized glossy paper (rolled paper) by use of an ink-jet recording oil-based ink in each of Examples 1 to 10 and Comparative Examples 1 to 5, and the printed paper was cut to a size corresponding to the size "A0" to provide one hundred printed matters. On the basis of the number of sheet when no printed portion (namely, a portion on which no printing is made since no ink has been spouted from almost the all nozzles) occurs after the beginning of printing, spouting stability at ordinary temperature was evaluated, wherein:

A: No printed portion occurs after seventy-first sheet, or no printed portion does not occur by one hundredth sheet;

B: No printed portion occurs on a fifty-first to seventieth sheet;

C: No printed portion occurs on a thirty-first to fiftieth sheet; and

D: No printed portion occurs by thirtieth sheet.

e. Spouting Stability at Low Temperature

The spouting stability of an ink-jet recording oil-based ink in each of Examples 1 to 10 and Comparative Examples 1 to 5 at a low temperature was evaluated in the same evaluation manner and on the basis of the same evaluation criteria as those of the above-mentioned spouting stability at ordinary temperature, except that the room temperature was changed to 5° C.

f. Drying Property on Paper Substrate

Under an environmental condition of a room temperature of 25° C. and a relative humidity of 60%, an ink-jet recording oil-based ink in each of Examples 1 to 10 and Comparative Examples 1 to 5 was solid-printed on a specialized glossy paper by using the same printer adapted to an ink-jet recording oil-based ink as the above-mentioned. On the basis of a period from the time of printing to the time when the recording liquid has not adhered to a finger touched thereto, drying performance was evaluated, wherein:

A: Dried within 2 seconds;

B: Dried within 5 seconds over 2 seconds; and

C: Not dried even over 5 seconds.

g. Cockling Property

An image which was set so that a printed area might occupy 10% of the whole area of paper was printed on a specialized glossy paper by using an ink-jet recording oil-based ink in each of Examples 1 to 10 and Comparative Examples 1 to 5 to obtain a printed matter, followed by cutting into a size of "A4". Then, one of the resultant sheets was interposed in a commercial transparent document holder (CLEAR BOOK ra-460B, made by KOKUYO CO., LTD.), and was kept at room temperature for a period of one week, and then, cockling property thereof was evaluated on the basis of the external appearance of the transparent document holder, wherein A: No change is observed;

B: A wrinkle due to swelling is partially observed, but no deflection is observed; and C: Deflection due to swelling is observed all over the surface.

Additionally, regarding the spouting stability at ordinary temperature and that at a low temperature in the above-mentioned evaluation, it was judged that each of the grades "A" and "B" is of good performance; the grade "C" is of such performance that there is no problem in view of use; and the grade "D" is of such performance that causes inconvenience in view of use, while regarding the other items, the grade "A" is of good performance; the grade "B" is of such performance that there is no problem in view of use; and the grade "C" is of such performance that causes inconvenience in view of use.

TABLE 1

|  | Example | | | | | | | | | | Comparative Example | | | | |
|---|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 | 5 |
| Ink composition | | | | | | | | | | | | | | | |
| No. 40-S | 40 | 40 | 40 | 40 | 40 | — | — | — | — | — | 40 | — | — | — | — |
| No. 55-S | 30 | 20 | — | 30 | 30 | — | — | — | — | — | 40 | — | — | — | — |
| Isopar-M | — | — | — | — | — | 40 | 40 | 37 | 40 | 40 | — | 40 | 40 | 40 | 30 |
| IP Solvent 2835 | — | — | — | — | — | 30 | 20 | — | — | 20 | — | 40 | 20 | 20 | — |
| Exxsol D130 | — | — | — | — | — | — | — | 20 | — | — | — | — | 20 | — | — |
| Soybean oil | 10 | 20 | 40 | — | 10 | 10 | 20 | 43 | 20 | — | — | — | — | — | 50 |
| Rape seed oil | — | — | — | 10 | — | — | — | — | — | 20 | — | — | — | — | — |
| Oleyl alcohol | — | — | — | — | — | — | — | — | — | — | — | — | — | 20 | — |
| Base ink No. 1 | 20 | 20 | 20 | 20 | — | — | — | — | — | — | 20 | — | — | — | — |
| No. 2 | — | — | — | — | 20 | — | — | — | — | — | — | — | — | — | — |
| No. 3 | — | — | — | — | — | 20 | 20 | 20 | 20 | 20 | — | 20 | 20 | 20 | 20 |
| Ink characteristics | | | | | | | | | | | | | | | |
| Surface tension (dyne/cm) | 28 | 28 | 29 | 28 | 28 | 26 | 26 | 28 | 28 | 26 | 26 | 25 | 27 | 28 | 30 |
| Contact angle (degree) | 47 | 47 | 48 | 47 | 47 | 40 | 42 | 45 | 46 | 43 | 44 | 35 | 43 | 45 | 48 |
| Low temperature storage stability | A | A | A | A | A | B | A | A | A | A | C | C | B | C | A |
| Spouting stability at ordinary temp. | A | A | B | A | A | C | C | C | B | C | D | D | D | C | C |
| Spouting stability at low temp. | A | A | B | A | A | C | C | C | B | C | D | D | D | D | D |
| Drying performance on paper substrate | A | A | B | A | A | A | A | B | A | A | A | A | A | A | C |
| Cockling property | A | A | A | A | A | A | A | A | B | A | B | A | C | B | A |

As specifically shown by means of Examples and Comparative Examples, the ink-jet recording oil-based ink of the present invention can form printed images having a good print quality, without being influenced by temperature changes in a printing circumstance, and furthermore, it is an ink-jet recording oil-based ink which is excellent even in storage stability at a low temperature.

What is claimed is:

1. An oil-based ink for ink-jet recording consisting essentially of an organic solvent, a pigment and a dispersing agent, said organic solvent comprising a saturated hydrocarbon solvent and a vegetable oil in a weight ratio of 100:(10 to 100), wherein said oil-based ink has a viscosity in the range of 1.0 to 30 mPa·s at an environment temperature on use.

2. The oil-based ink for ink-jet recording of claim 1, wherein said saturated hydrocarbon solvent comprises both components of an isoparaffin solvent and a cycloparaffin solvent.

3. The oil-based ink for ink-jet recording of claim 1, wherein said saturated hydrocarbon solvent comprises a liquid paraffin as a main component, said liquid paraffin having a viscosity of 20 mPa·s or less at a temperature of 25° C.

4. The oil-based ink for ink-jet recording of claim 1, wherein said vegetable oil comprises at least one selected from the group consisting of a semidrying oil and a nondrying oil.

5. The oil-based ink for ink-jet recording claim 1, wherein said vegetable oil comprises at least one selected from the group consisting of soybean oil, rape seed oil and olive oil.

6. The oil-based ink for ink-jet recording of any one of claim 1, wherein said dispersing agent comprises a reaction product of an amine compound and a self condensation product of 12-hydroxystearic acid.

7. The oil-based ink for ink-jet recording of any one of claim 1, which has a surface tension of 26 to 30 dyne/cm at a temperature of 25° C., and a contact angle to an ethylene fluoride/propylene copolymer film of 40° to 50°.

8. The oil-based ink for ink-jet recording of any one of claim 1, which has a volume resistivity of $10^8$ Ω·cm or more.

9. An oil-based ink for ink-jet recording comprising mainly an organic solvent, a pigment and a dispersing agent, said organic solvent comprising a saturated hydrocarbon solvent and a vegetable oil in a weight ratio of 100:(10 to 100), wherein said dispersing agent comprises a reaction product of an amine compound and a self condensation product of 12-hydroxystearic acid.

10. The oil-based ink for ink-jet recording of claim 1, which further contains a binder resin.

11. The oil-based ink for ink-jet recording of claim 1, which further contains at least one additive agent selected from the group consisting of a surface active agent, a viscosity modifier, an anti-foaming agent and a film-forming assistant.

* * * * *